United States Patent
Fletcher (10) Patent No.: US 11,434,949 B2
(45) Date of Patent: Sep. 6, 2022

(54) JOINT ASSEMBLY

(71) Applicant: Spaced In Limited, Mitcham (GB)

(72) Inventor: Benedict Isambard Statham Fletcher, Mitcham (GB)

(73) Assignee: Spaced In Limited, Mitcham (GB)

( * ) Notice: Subject to any disclaimer, the term of this patent is extended or adjusted under 35 U.S.C. 154(b) by 887 days.

(21) Appl. No.: 16/136,358

(22) Filed: Sep. 20, 2018

(65) Prior Publication Data

US 2020/0025232 A1    Jan. 23, 2020

(30) Foreign Application Priority Data

Jul. 20, 2018   (GB) ...................................... 6039739

(51) Int. Cl.
*F16B 12/12*   (2006.01)

(52) U.S. Cl.
CPC .... *F16B 12/125* (2013.01); *A47B 2230/0077* (2013.01); *A47B 2230/0085* (2013.01); *A47B 2230/0092* (2013.01); *A47B 2230/0096* (2013.01); *E04F 2201/0107* (2013.01); *E04F 2201/0138* (2013.01)

(58) Field of Classification Search
CPC ............ F16B 12/125; E04F 2201/0138; E04F 2201/0107; A47B 2230/0092; A47B 2230/0077; A47B 2230/0085; A47B 2230/0096
USPC .......................................................... 403/345
See application file for complete search history.

(56) References Cited

U.S. PATENT DOCUMENTS

| | | | | |
|---|---|---|---|---|
| 2,369,930 | A * | 2/1945 | Wagner, Sr. ............. | A47C 9/04 248/188 |
| 8,220,398 | B1 * | 7/2012 | Brandenberg ........... | A47B 3/06 108/158.12 |
| 9,826,828 | B1 * | 11/2017 | Vaughan, Jr. ........ | A47B 47/042 |
| 10,823,214 | B2 * | 11/2020 | Davis ...................... | F16B 12/46 |

(Continued)

FOREIGN PATENT DOCUMENTS

| | | | | |
|---|---|---|---|---|
| DE | 102013100352 A1 * | 7/2014 | ............... | E04B 1/54 |
| GB | 6039739 | 7/2018 | | |
| KR | 101481751 B1 * | 1/2015 | | |

OTHER PUBLICATIONS

Foff Design "Foff Design Shelfassembly Video", YouTube, Video, Aug. 24, 2018.

(Continued)

*Primary Examiner* — Daniel J Troy
*Assistant Examiner* — Timothy M Ayres (57) ABSTRACT

In an aspect there is provided a joint assembly 16 for panel board materials, comprising: a first member 14 comprising a tongue 22 extending from a surface 26 of the first member 14, the tongue 22 comprising a first groove 24 in a side 28 of the tongue 22; wherein at least a portion of the side 28 of the tongue 22 including the first groove 24 extends generally perpendicular to the surface 26 of the first member 14; and a second member 12 comprising: a second groove 32 in a surface 36 of the second member 12, the second groove 32 being arranged to receive the tongue 22; and a lip 34 extending into the second groove 32; wherein, in an assembled position, the tongue 22 is arranged to slot into the second groove 32 and the lip 34 is arranged to slot into the first groove 24 thereby to join the first and second members 14, 12.

20 Claims, 8 Drawing Sheets

(56) References Cited

U.S. PATENT DOCUMENTS

| | | | | |
|---|---|---|---|---|
| 2012/0080910 A1* | 4/2012 | Davis | ................... | A47C 4/021 |
| | | | | 297/118 |
| 2013/0239509 A1* | 9/2013 | Wang | ................... | F16B 12/125 |
| | | | | 52/704 |
| 2014/0059829 A1* | 3/2014 | Weber | ................... | F16B 12/125 |
| | | | | 29/428 |
| 2014/0064833 A1* | 3/2014 | Reeves | ................... | F16B 5/01 |
| | | | | 403/291 |
| 2014/0102590 A1* | 4/2014 | Towey | ................... | F16B 12/04 |
| | | | | 144/347 |
| 2018/0112696 A1* | 4/2018 | Davis | ................... | F16B 12/46 |
| 2019/0040890 A1* | 2/2019 | Davis | ................... | A47B 88/941 |
| 2019/0059593 A1* | 2/2019 | Davis | ................... | B27M 3/18 |
| 2019/0059594 A1* | 2/2019 | Davis | ................ | A47B 47/0066 |

OTHER PUBLICATIONS

Foff Design "Foff.Designs Shelving", YouTube Video, Aug. 2, 2018.

Foff Design "The Future of Flatpack Furniture", Foff Desig, Product Video, 2018.

* cited by examiner

JOINT ASSEMBLY

RELATED APPLICATION

This application claims the benefit of priority of Great Britain Design Patent Application No. 6039739 filed on Jul. 20, 2018, the contents of which are incorporated herein by reference in their entirety.

FIELD AND BACKGROUND OF THE INVENTION

The present invention relates to a joint assembly, in particular for fiberboard panels. The invention extends to a method of manufacturing the joint assembly and a non-transitory software program for executing the method.

Fiberboard, such as medium density fiberboard (MDF), is widely used in the construction of a wide range of furniture, such as cabinets, shelving, and beds. So that this furniture can be transported, it is often designed in the form of flat-pack components (consisting of several flat panels), which are secured together at the location of use. This generally requires the use of external fasteners, such as screws, which are easy to misplace, difficult to use, and can necessitate the use of specialist tools.

Woodworking joints such as sliding dovetail joints are known for joining wooden members. Such joints are however difficult or even impossible to manufacture using conventional 3-axis computer numerical cutting (CNC) milling machines, reducing their utility—generally, 5 axis machines or 3 axis machines including suction pads are necessary.

Aspects and embodiments of the present invention are set out in the appended claims. These and other aspects and embodiments of the invention are also described herein.

In an aspect, there is provided a joint assembly for panel board materials, comprising: a first member comprising a tongue extending from a surface of the first member, the tongue comprising a first groove in a side of the tongue; wherein at least a portion of the side of the tongue including the first groove extends generally perpendicular to the surface of the first member; and a second member comprising: a second groove in a surface of the second member, the second groove being arranged to receive the tongue; and a lip extending into the second groove; wherein, in an assembled position, the tongue is arranged to slot into the second groove and the lip is arranged to slot into the first groove thereby to join the first and second members.

The sides of the first groove may be generally perpendicular to the side of the tongue in which the first groove is located. The sides of the second groove may be generally perpendicular to the surface of the second member in which the first groove is located. The upper surface of the lip may be continuous with the surface of the second member, preferably wherein a lower surface of the lip is parallel to the upper surface of the lip. The first groove may be located at a base of the tongue. The tongue may have a proximal portion and a distal portion, where the first groove is located in the proximal portion.

The first and second members may be pieces of panel material. The tongue may be on an edge of the first member. The tongue may be rebated. The panel material may be a fiberboard material, preferably wherein the fiberboard comprises one of: medium density fiberboard (MDF), melamine faced chipboard (MFC), and edgebanded fiberboard. The lip may be formed from a relatively hard outer part of a fiberboard material and the tongue may be formed from a relatively soft inner part of a fiberboard material. The first and second members may be formed from a single piece of fiberboard material. The panel material is preferably a relatively rigid material, such that a direct "push-fit" connection between the first and second members (where the tongue is forced past the lip) is not possible.

The first and second members may be joined by an interference fit between the lip and first groove. In the assembled position, the first member may be perpendicular to the second member.

The tongue and lip may be crenelated such that the tongue can be located into the second groove from above the second groove. The second groove may not extend to either end of the surface of the second member in which the second groove is located. The first groove may extend throughout the non-crenelated portions of the tongue.

The tongue may be machined from only one side of the first member. The second groove and lip may be machined from only one side of the second member.

In an aspect, there is provided a method of manufacturing a joint assembly comprising: providing a first member; forming a tongue extending from a surface of the first member; forming a first groove in a side of the tongue; wherein at least a portion of the side of the tongue including the first groove extends generally perpendicular to the surface of the first member; providing a second member; and forming a second groove in a surface of the second member, the second groove being arranged to receive the tongue, and a lip extending into the second groove; wherein, in an assembled position, the tongue is arranged to slot into the second groove and the lip is arranged to slot into the first groove thereby to join the first and second members.

At least one of: forming a tongue extending from a surface of the first member; forming a first groove in a side of the tongue; and forming a second groove in a surface of the second member, the second groove being arranged to receive the tongue, and a lip extending into the second groove; may comprise using a 3-axis computer numerically controlled (CNC) router, preferably a 3-axis CNC router comprising an autochange cutter (ATC).

In an aspect, there is provided a non-transitory software product or computer program product arranged to perform the method described herein.

In an aspect, there is provided a method of assembling a joint assembly, the method comprising: providing a first member comprising a tongue extending from a surface of the first member, the tongue comprising a first groove in a side of the tongue; wherein at least the side of the tongue including the first groove extends generally perpendicular to the surface of the first member, the tongue comprising crenellations; providing a second member comprising: a second groove in a surface of the second member, the second groove being arranged to receiving the tongue; and a lip extending into the second groove, the lip comprising crenellations corresponding to the crenellations of the tongue; locating the tongue in the second groove from above via the respective crenellations of the tongue and the lip; and moving the first member relative to the second member such that the tongue slots into the second groove and the lip slots into the first groove thereby to join the first and second members.

In an aspect, there is provided a joint assembly for panel board materials, comprising: a first member comprising a tongue extending from a surface of the first member, the tongue comprising a first groove in a side of the tongue; and a second member comprising: a second groove in a surface of the second member, the second groove being arranged to receive the tongue; and a lip extending into the second groove; wherein, in an assembled position, the tongue is arranged to slot into the second groove and the lip is arranged to slot into the first groove thereby to join the first and second members. Optionally, the tongue and tip comprise corresponding crenellations such that the tongue can be located into the second groove in an unassembled position.

In an aspect, there is provided a joint assembly for panel board materials, comprising: a first member comprising a first engagement formation; a second member comprising a second engagement formation; wherein the first and second engagement formations are configurable to engage to join the first and second members (optionally by a translation of the first member relative to the second member); wherein the first and second engagement formations are crenelated such that the first and second engagement formations can be located for engagement (optionally by translation of the first member relative to the second member in a direction perpendicular to the previously mentioned translation).

In an aspect, there is provided a first member for use in a joint assembly for panel board materials, comprising: a tongue extending from a surface of the first member, the tongue comprising a first groove in a side of the tongue; wherein at least a portion of the side of the tongue including the first groove extends generally perpendicular to the surface of the first member.

In an aspect, there is provided a second member for use in a joint assembly for panel board materials, comprising: a second groove in a surface of the second member, the second groove being arranged to receive a tongue; and a lip extending into the second groove.

In an aspect, there is provided a furniture item comprising one or more joint assemblies as described herein. The furniture item may be formed by a plurality of members joined by joint assemblies as described herein, wherein the members are configured to lock together so as to form a complete furniture item without fixings or adhesives.

In summary, the present invention may take the combined characteristics of CNC routers and board materials which the furniture industry currently manages with complex machines, multiple processes and single use mechanical fixings, and may use these characteristics as advantages.

The present invention may provide a joint assembly made up of first and second members (or "components"), where both components are crenelated allowing the first member with the crenelated tongue which also has a groove set into the higher portions of the tongue to be inserted into the second member with the crenelated housing (or "second groove"). The second member has undercuts below the narrower parts of the crenelated housing to create a lip. Once the higher portions of the first member have been aligned with the wider portions of the second member the first portion can be inserted into the second portion. Moving the first member relative to the second member such that the tongue slots into the undercut of the second member and the lip slots into the groove in the first member's crenelated tongue joins the first and second members.

The invention extends to any novel aspects or features described and/or illustrated herein.

Any feature in one aspect of the disclosure may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure extends to methods and/or apparatus substantially as herein described with reference to the accompanying drawings.

As used herein, the term "generally perpendicular" preferably connotes a plane that is arranged at between 70° and 110° relative to another plane, more preferably between 80° and 100°, yet more preferably between 85° and 95°, and most preferably between 88° and 92°.

As used herein, the term "panel board material" preferably connotes a wood product having a generally panel-shaped form. As used herein, the term "panel board material" and "panel material" should be understood to be synonymous.

As used herein, the term "fiberboard" preferably connotes an engineered wood product that is made out of wood fibers.

The disclosure will now be described by way of example, with references to the accompanying drawings in which:

DESCRIPTION OF SPECIFIC EMBODIMENTS OF THE INVENTION

Figure 1A:
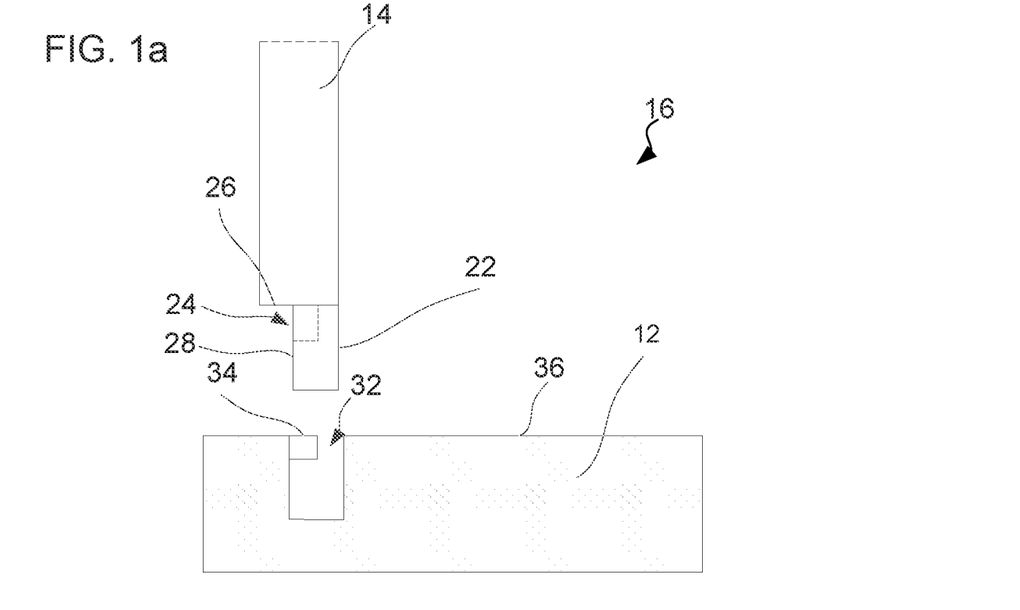
FIGS. 1a and 1b show a joint assembly according to the present invention.
Figure 1B:
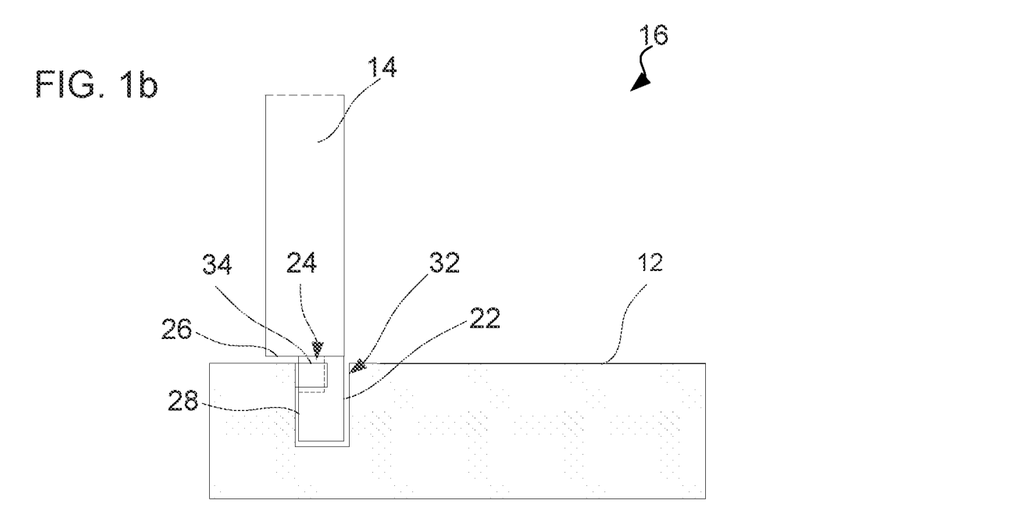

FIGS. 1a and 1b show a joint assembly 16 according to the present invention. The joint assembly 16 comprises a first member 14 and a second member 12, which fit together to form the joint assembly 16. The first member 14 and second member 12 are pieces of panel material, specifically fiberboard material.

The first member 14 comprises a male part referred to as the tongue 22. The tongue 22 extends from an edge surface 26 of the first member 14 at a right angle (i.e. perpendicular) to the surface 26. The tongue 22 is rebated in the first member 14, such that the tongue 22 is less wide than the first member 14 as a whole. The tongue 22 is generally rectangular in shape, although it will be appreciated that other shapes are possible.

The tongue 22 includes a first groove 24 in a side 28 of the tongue 22 (i.e. the side that is rebated away from the edge of the first member 14). The first groove 24 is located proximate the surface 26 (i.e. at a base or proximal end of the tongue 22). The sides of the first groove 24 are generally perpendicular to the side 28 of the tongue 22 in which the first groove 24 is present. Accordingly, all of the angles on and around the tongue 22 are 90 degree angles.

The second member 12 comprises a female part referred to as the second groove 32. The second groove 32 is provided in a face surface 36 of the second member 12, with the sides of the second groove 32 being perpendicular to the surface 36 of the second member 12 in which the groove is located.

The second member 12 further comprises a lip 34 which extends into the second groove 32. The lip 34 is located proximate the surface 36 in which the second groove 32 is located, and an upper surface of the lip 34 is continuous with the surface 36 in which the groove is located. A lower surface of the lip 34 is parallel to the upper surface of the lip 34. The lip 34 is formed by undercutting the second groove 32. Accordingly, all of the angles in and around the second groove 32 are 90 degree angles.

The width of the second groove 32 is slightly greater than the width of the tongue 22 and the depth of the second groove 32 is slightly greater than the height of the tongue 22 (i.e. the extension of the tongue 22 away from the edge surface 26), such that the tongue 22 can fit into the second groove 32.

Similarly, the width of the first groove 24 is configured to be slightly smaller (or the same) as the width of the lip 34 and the depth of the first groove 24 is slightly smaller (or the same) than the extension of the lip 34 into the first groove 24, such that the lip 34 can fit into the first groove 24 in an interference fit. In alternative embodiments, the lip 34 may be smaller than the first groove 24 so as to provide a less tight fit.

The first and second members 14, 12 can be fitted into an assembled position by the first member 14 being moved relative to the second member 12 so as to slot the tongue 22 into the second groove 32 and the lip 34 into the first groove 24. This assembled position is shown in FIG. 1b. The lip 34 and first groove 24 form a "hook" in the face surface 36 of the second member 12, preventing the first and second member 14, 12 from being separated by the tongue 22 being pulled out of the second groove 32 (from above). Similarly, the interference between the lip 34 and the tongue 22 prevents the tongue 22 being directly inserted into the groove 32 from above in at least some positions. In such a manner, the first member 14 may be joined to the second member 12 via the described joint assembly 16, with the first member 14 extending perpendicular to the second member 12.

Figure 2A:
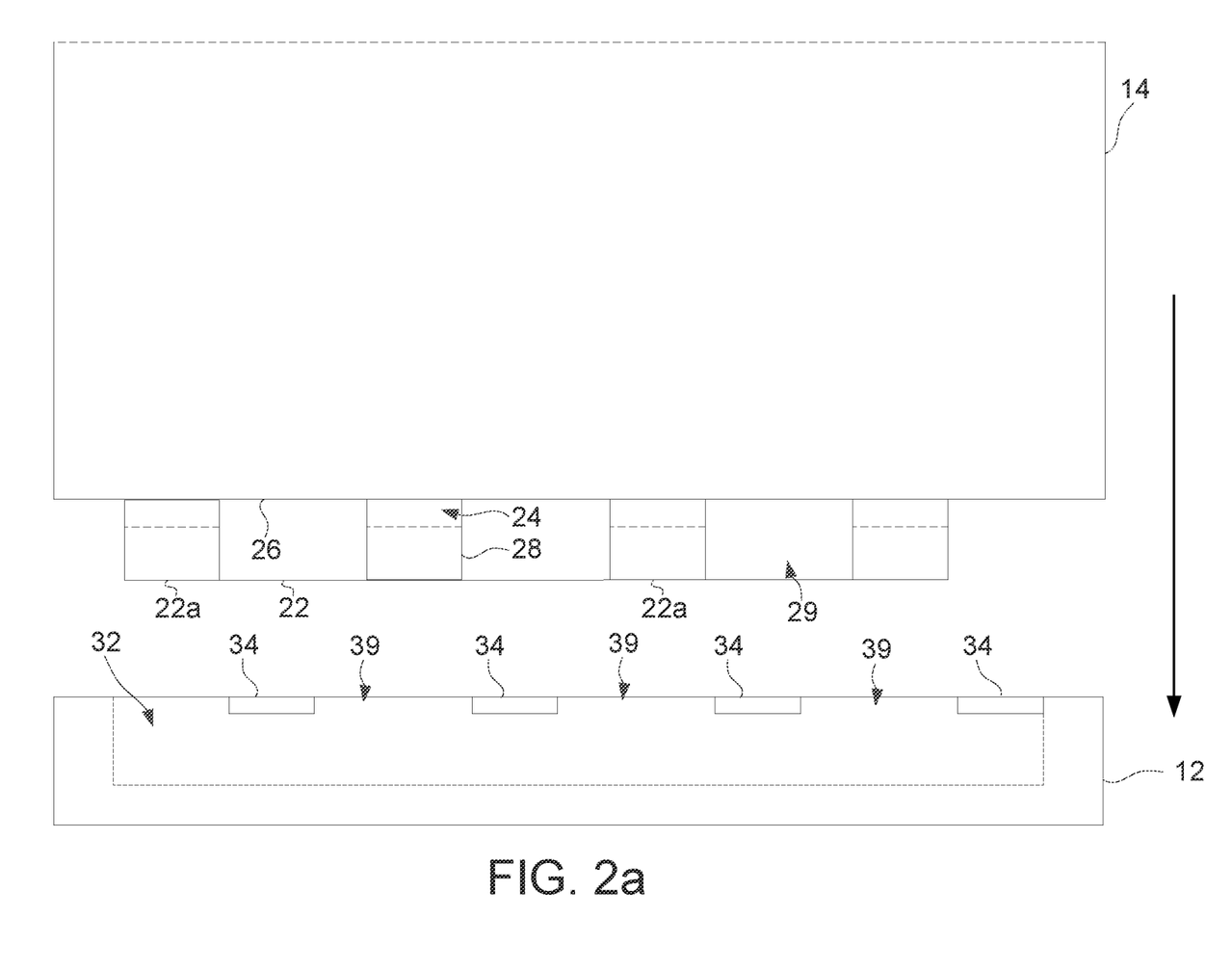
FIG. 2a shows the joint assembly from a different angle.

FIG. 2a shows the joint assembly of FIG. 1a from an alternative angle, at 90 degrees to the view shown in FIG. 1a. As is visible in FIG. 2a, the tongue 22 and lip 34 are crenelated (i.e. they are discontinuous, with the discontinuities forming a regular pattern). The crenellations shown in FIG. 2a are exaggerated for visibility. The crenellations 39, 29 in the lip 34 and the tongue 22 allow the tongue 22 to be inserted into the second groove 32 from above in a position where the lip 34 and tongue 22 do not interfere.

In more detail, the lip 34 is cut so as to form a crenelated pattern at the surface of the second groove 32, being made up of wider sections (where the lip 34 is not present) and narrower sections (where the lip 34 is present). This pattern is visible in FIG. 2a.

Similarly, the tongue 22 is cut so as to include a crenelated pattern, formed of narrower portions (i.e. the crenellations 29 themselves) and wider portions 22a (forming the main body of the tongue as described above). The first groove 24 extends all the way through the wider portions 22a of the tongue 22, but not through the crenellations 29—in other words, the material of the tongue 22 is wider at the first groove 24 than at the crenellations 29, and wider at the wider portions 22a than at the first groove 24. The inclusion of a thin portion of material in the crenellations 29 of the tongue 22 (rather than no material at all) may improve the strength of the tongue 22. Providing the first groove 24 all the way through each of the wider portions 22a of the tongue 22 may improve the length and therefore the strength of the connection between the first and second members 14, 12.

Figure 2B:
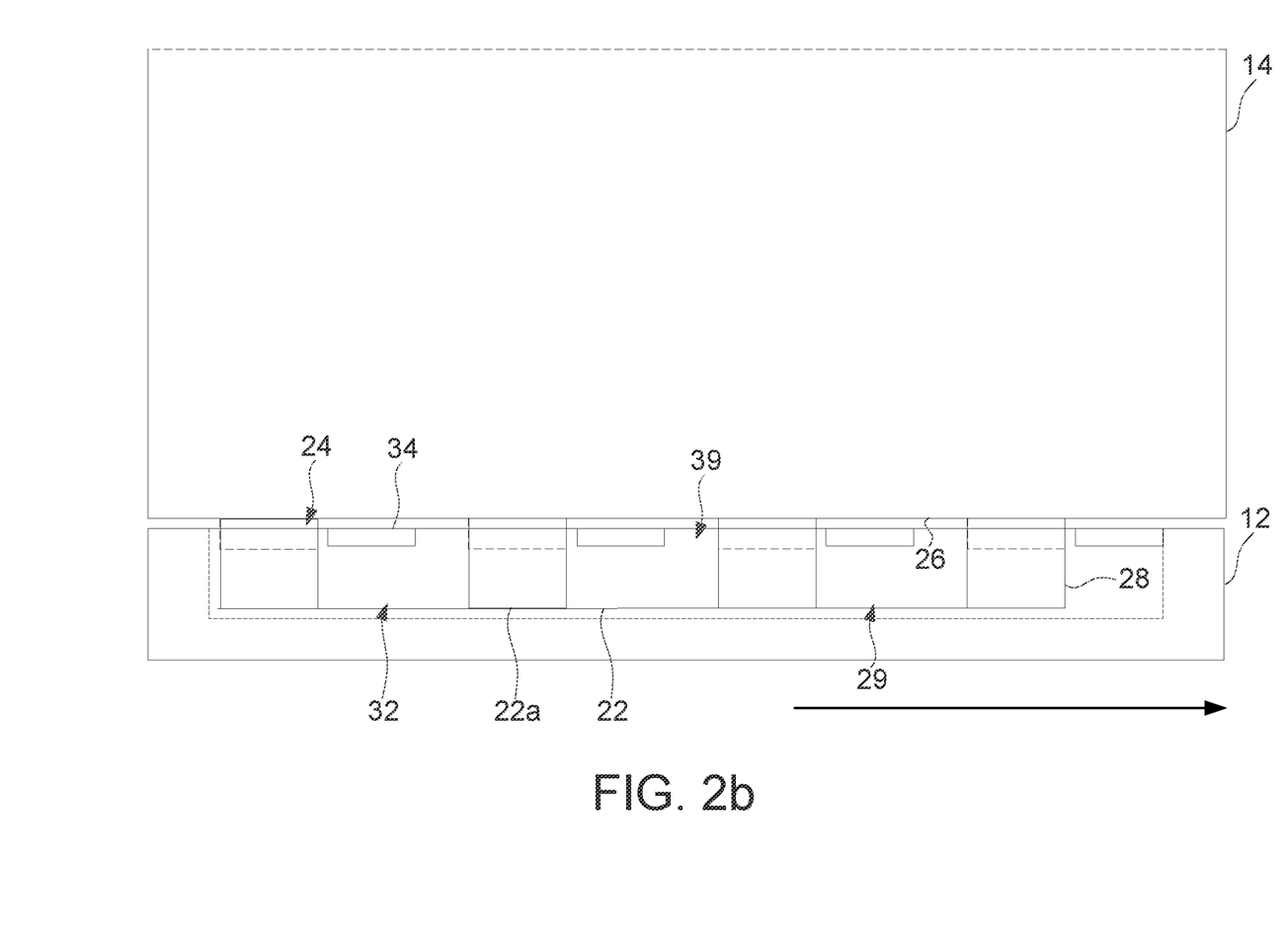
FIGS. 2b and 2c show the way in which the joint assembly is assembled.
Figure 2C:
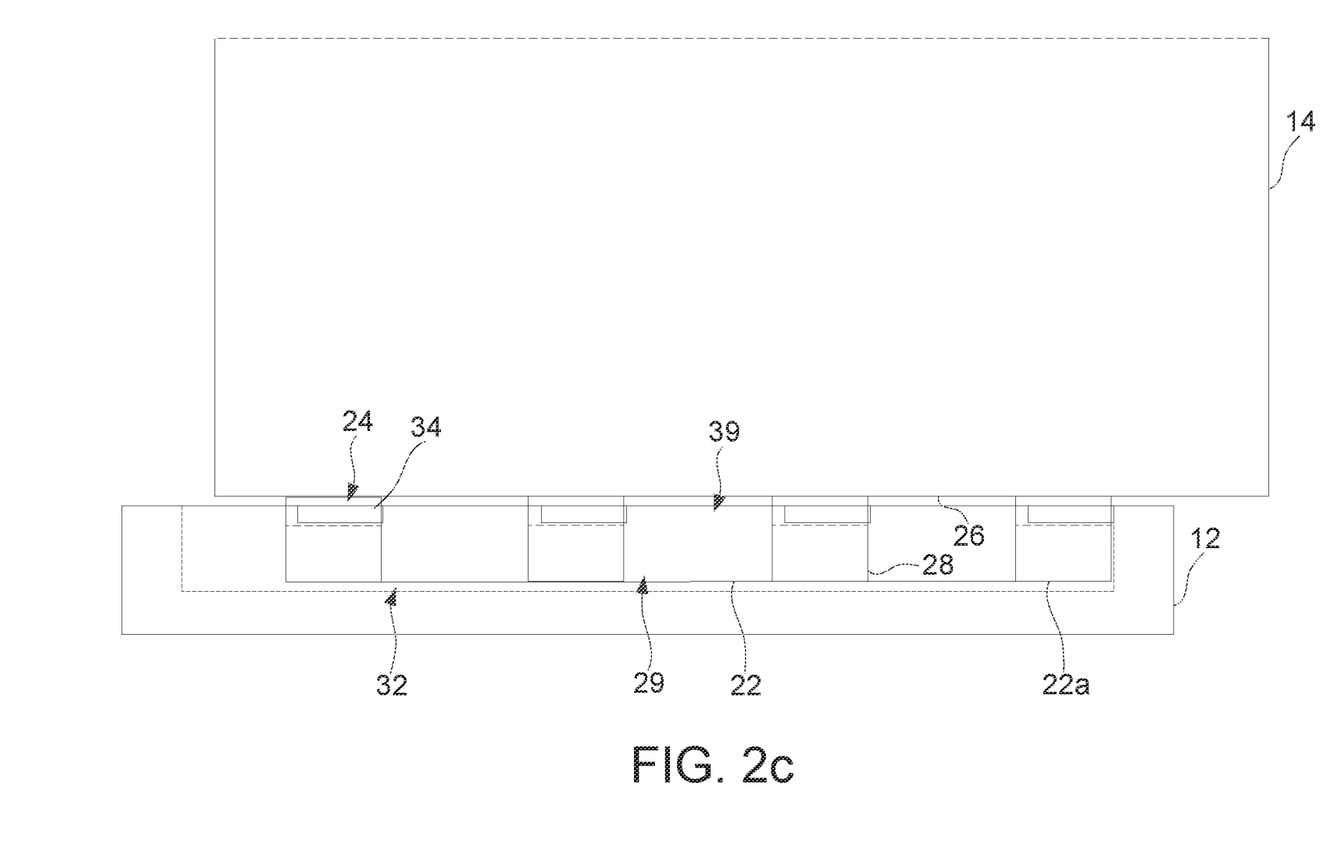

FIG. 2b shows the joint assembly 16 of FIG. 2a in which the tongue 22 has been inserted into the second groove 32. FIG. 2c shows the joint assembly 16 of FIG. 2b in which the first and second members 14, 12 have been slotted into the assembly position. Once the tongue 22 has been inserted into the second groove 32, the first and second members 14, 12 may be moved relative to each other to engage the lip 34 with the first groove 24, thereby preventing removal of the tongue 22 from the second groove 32 from above as previously described. As will be appreciated, the use of crenellations means that it is only necessary to move the members a short distance relative to each other to assemble the joint assembly 16, which may improve ease of assembly.

Since the tongue 22 may be inserted into the second groove 32 from above in certain positions, the second groove 32 does not need to extend to the edges of the second member 12 in order to allow the tongue 22 to enter the second groove 32. Accordingly, as shown in FIGS. 2a to 2c, the second groove 32 does not extend to either end of the surface 36 of the second member 12 in which the second groove 32 is located, which may improve the strength of the second member 12. The use of a groove which does not extend to the edge may also allow the groove to be machined anywhere on the face and at any angle.

The fit between the lip 34 and second groove 32 is generally tight enough to hold the first and second member together in the absence of any external force (other than normal gravity). In some use cases, this fit will be sufficient for use. In other use cases, the joint assembly 16 may be augmented by further fastenings, such as glue or screws. The joint may be undone by reversing the fitment described with reference to FIGS. 2a to 2c.

Figure 3A:
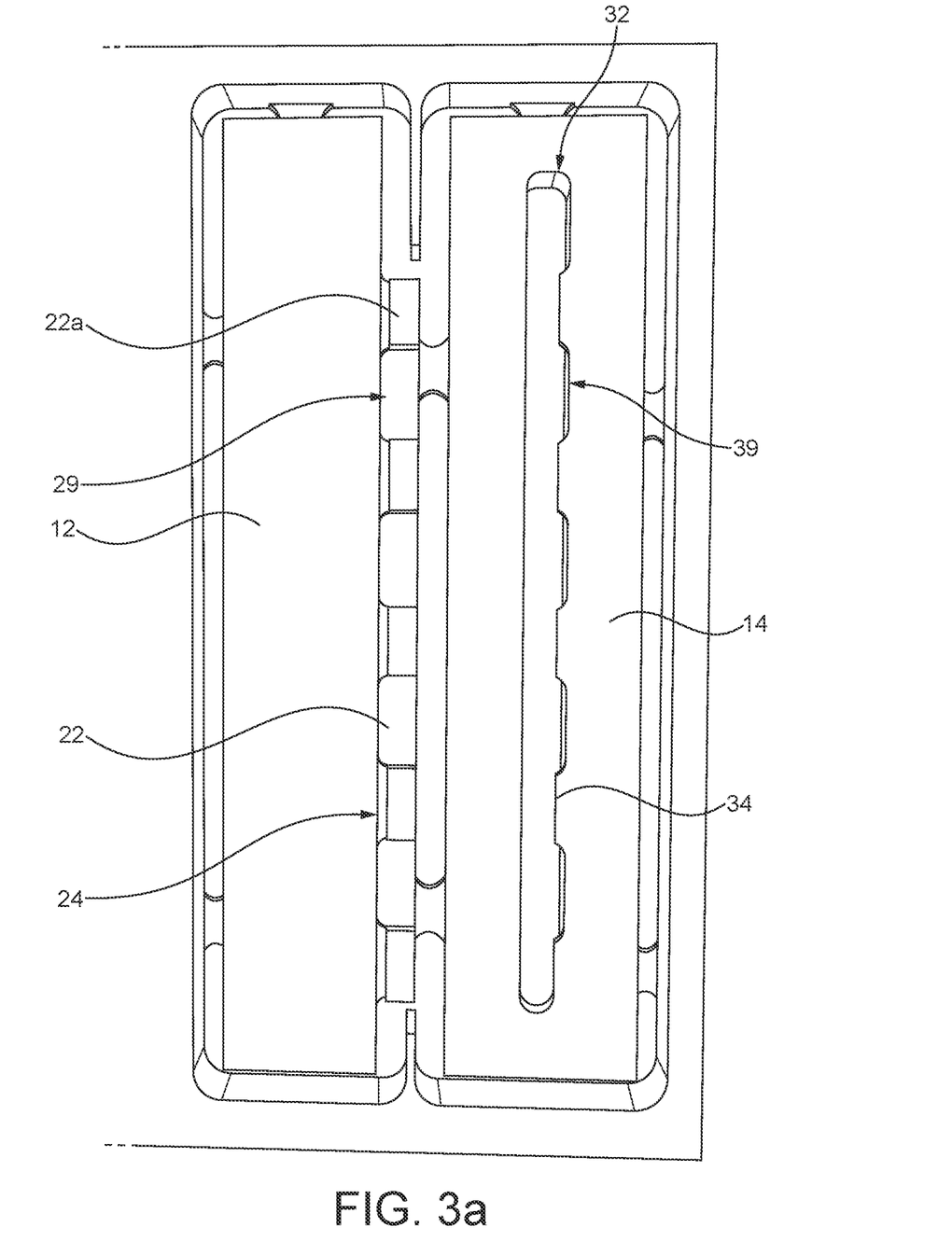
FIG. 3a shows a view of the unassembled joint assembly.
Figure 3B:
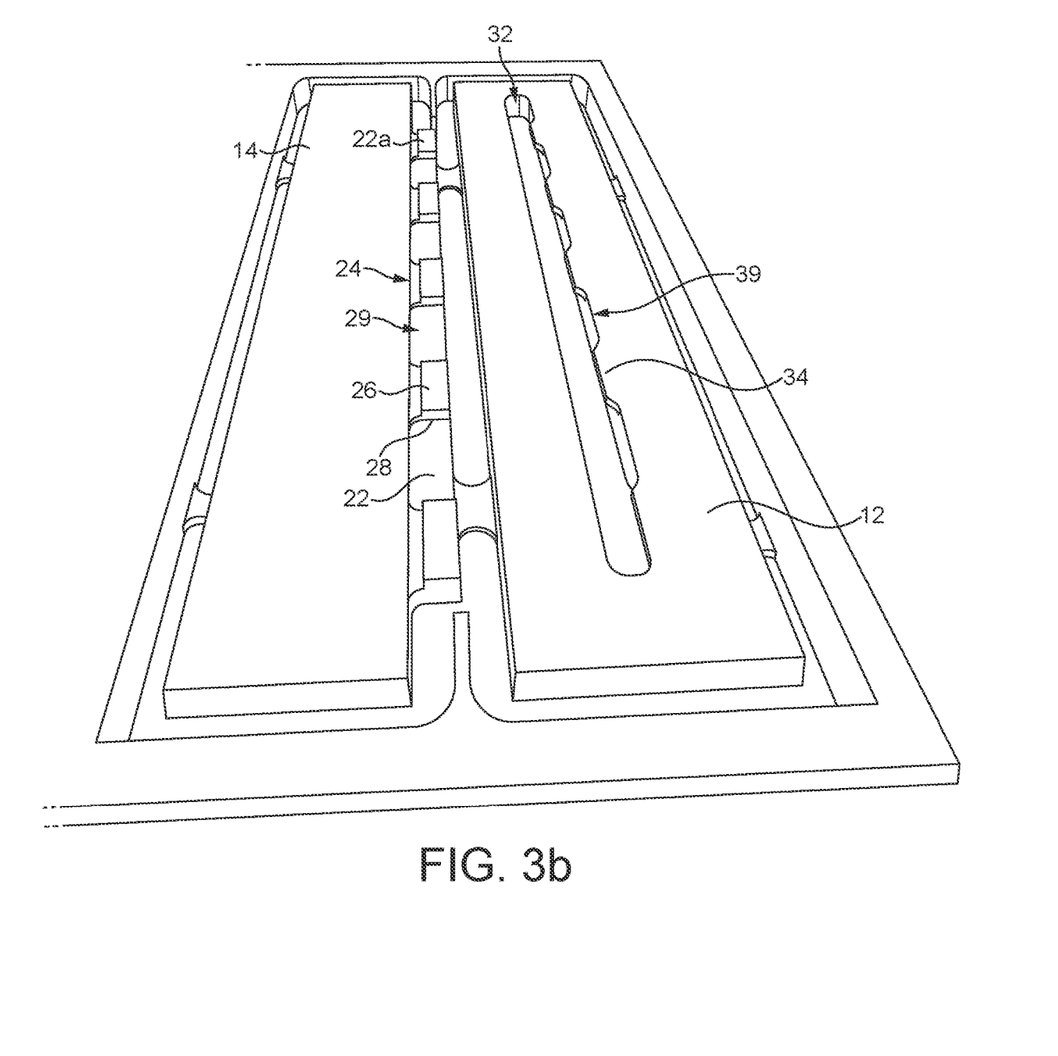
FIG. 3b shows a further view of the unassembled joint assembly.

FIGS. 3a and 3b show views of the unassembled joint assembly.

As mentioned, the first and second members are formed from panelboard materials. Specifically, the first and second members are formed from a fiberboard material, such as edgebanded melamine faced chipboard (MFC). Other types of fiberboard material, in particular medium density fiberboard (MDF), are well known. Fiberboard materials are very prevalent throughout the woodwork and furniture industry. A particular property of fiberboard materials is that they often include a relatively hard outer portion (which are treated or otherwise manufactured to provide a hard outer surface) and a relatively soft inner portion (which are generally untreated, because there is no need to do so).

The present invention uses these properties to provide improvements to the joint assembly 16. As will be appreciated, the lip 34 is continuous with the surface 36 of the second member 12 in which the second member 12 is provided. Accordingly, the lip 34 comprises (or consists of) the hard outer portion of the material. The tongue 22 (including the first groove 24) is rebated into the first member 14, and so is formed out of the soft inner portion of the material (at least on the part of the tongue 22 having the first groove 24). Accordingly, the joint assembly 16 includes a hard part of the material which joins with a soft part of the material. In use, this allows for the soft tongue 22 to deform slightly under pressure from the hard lip 34 in an interference fit, which may provide an improved fit between the first and second member.

The particular structure of the joint assembly 16 may provide for improved manufacturing of the joint assembly 16. In particular, the fact that the all of the angles and around the tongue 22 and in and around the second groove 32 are 90 degree angles may allow the tongue 22 and/or lip 34 and second groove 32 to be machined using a conventional 3-axis CNC router (with an autochange cutter) from one side (i.e. without a need to turn or reposition the piece out of which the first and/or second member are being formed). In particular, the lip 34 may be readily formed by undercutting the second groove 32 using a CNC keyhole cutter, whereas such an operation may be difficult or even impossible to do by hand.

In more detail, the tongue 22 may be machined entirely from a face of the first member 14, where manufacturing comprises only simple manufacturing operations (where the order of the following is merely exemplary)—cutting the piece to size, cutting a rebate to form the tongue 22, cutting the crenellations 29, cutting the first groove 24, and any necessary finishing.

Similarly, the lip 34 and second groove 32 may be formed entirely from a face of the second member 12, where manufacturing comprises only simple manufacturing operations (where the order of the following is merely exemplary)—cutting the second groove 32 (in narrower form), undercutting the groove (using a keyhole cutter) to form the crenelated lip 34, and any necessary finishing.

The ease of manufacturing which may be provided by the present invention is well suited to allow mass production of first and second members 14, 12 for use in the joint assembly 16. In a particular example, both the first and second members may be machined from a single piece of panel board, which may minimize material wastage and may improve ease of manufacture in many use cases. FIGS. 3a and 3b show the first and second members 14, 12 immediately after they have been machined from a single piece of panel board, as described.

Instructions (or a program) for manufacturing the first and/or second members may be saved into machine code which is useable by CNC machines. The use of such machine code instructions may allow for easy manufacturing—a CNC machine loaded with the instructions and having suitable material may manufacture both the first and second member based on a single user input. Where such a program is provided, it may include consideration of the materials and tools available and modify the dimensions and tolerances of the joint appropriately. Such a program may be stored on a server, a hard drive, or a USB stick and may be transferred between systems using an area network, such as the internet.

The dimensions of the material used may vary according to the particular use case of the joint assembly 16. At a minimum, the material of the second member 12 should be no less thick than 9 mm to ensure adequate strength. The joint assembly 16 works as a corner joint in material of a thickness of a 18 mm or above, in particular where the material is edgebanded MFC.

In a particular use case, a plurality of joint assemblies 16 are used to assemble a furniture item which "locks together" to form a complete linkage, in such a way that no additional fixings are required. A shelving unit may be a particularly useful application of such a furniture item formed without additional fixings.

Figure 4A:
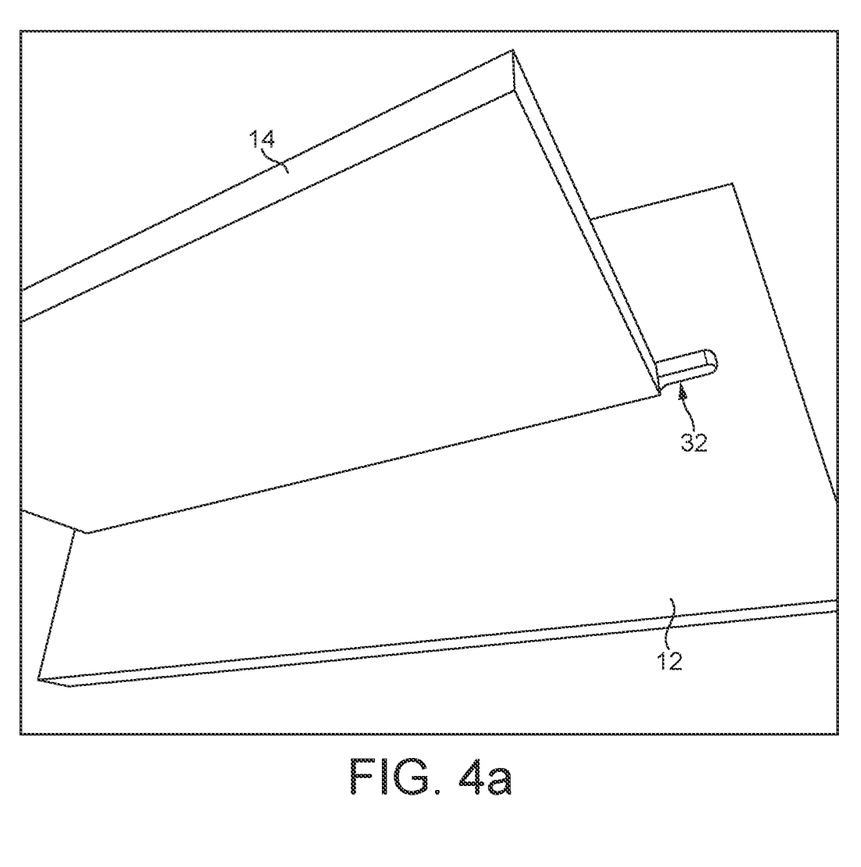
FIG. 4a shows the joint assembly in an unassembled position.
Figure 4B:
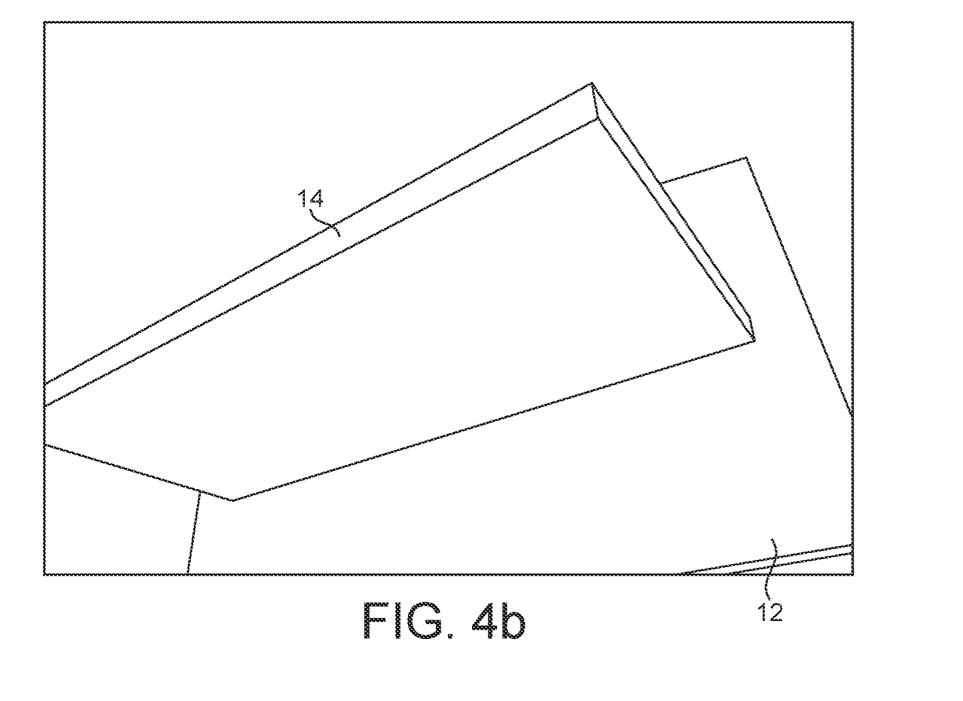
FIG. 4b shows the joint assembly in an assembled position.

FIG. 4a shows the first member 14 resting in the second groove 32 of the second member in an "unassembled" position (i.e. the position shown in FIG. 2a). FIG. 4b shows the first and second members 14, 12 in an assembled position, once the first member 14 has been moved relative to the second member 12 to slot the tongue 22 into the second groove 32 and the lip 34 into the first groove 24.

In an alternative, different materials to the described panelboard materials are used. For example, the joint assembly 16 may be implemented in solid timber, in particular a hardwood. Wood which ages and shrinks, such as unseasoned oak, may form a particularly strong (albeit irreversible) connection using the described joint assembly 16. As a further example, an alternative material that shrinks upon heating or upon drying may be used, where this may achieve a tighter fit after the members are joined. More specifically, in some embodiments the tongue 22 comprises a material that is shrinkable. In a further alternative, non-wood based materials may be used.

In an alternative, the first groove 24 may be stopped in each wider portion 22a of the tongue 22, so as to ensure that the lip 34 can cannot be pushed all the way through the first groove 24 and into another crenellation 29.

It will be understood that the present disclosure has been described above purely by way of example, and modifications of detail can be made within the scope of the invention.

Reference numerals appearing in the claims are by way of illustration only and shall have no limiting effect on the scope of the claims.

What is claimed is:

1. A joint assembly for panel board materials, comprising:
   a first member comprising a tongue extending from a surface of the first member, the tongue comprising a first groove in a side of the tongue; wherein at least a portion of the side of the tongue including the first groove extends generally perpendicular to the surface of the first member; and
   a second member comprising:
      a second groove in a surface of the second member, the second groove being arranged to receive the tongue; and
      a lip extending into the second groove;
   wherein, in an assembled position, the tongue is arranged to slot into the second groove and the lip is arranged to slot into the first groove thereby to join the first and second members;
   wherein the lip is formed from a relatively hard material and the tongue is formed from a relatively soft material;
   wherein the sides of the first groove are generally perpendicular to the side of the tongue in which the first groove is located; and
   wherein the sides of the second groove are generally perpendicular to the surface of the second member in which the first groove is located.

2. A joint assembly according to claim 1, wherein an upper surface of the lip is continuous with the surface of the second member.

3. A joint assembly according to claim 1, wherein the first groove is located at a base of the tongue.

4. A joint assembly according to claim 1, wherein the first and second members are pieces of panel material.

5. A joint assembly according to claim 4, wherein the tongue is on an edge of the first member.

6. A joint assembly according to claim 5, wherein the tongue is rebated.

7. A joint assembly according to claim 4, wherein the panel material is a fiberboard material.

8. A joint assembly according to claim 7, wherein the lip is formed from a relatively hard outer part of a fiberboard material and the tongue is formed from a relatively soft inner part of a fiberboard material.

9. A joint assembly according to claim 7, wherein the first and second members are formed from a single piece of fiberboard material.

10. A joint assembly according to claim 1, wherein the first and second members are joined by an interference fit between the lip and first groove.

11. A joint assembly according to claim 1, wherein, in the assembled position, the first member is perpendicular to the second member.

12. A joint assembly according to claim 1, wherein the tongue and lip are crenelated such that the tongue can be located into the second groove from above the second groove.

13. A joint assembly according to claim 1, wherein the tongue is machined from only one side of the first member.

14. A joint assembly according to according to claim 1, wherein the second groove and lip are machined from only one side of the second member.

15. A method of manufacturing a joint assembly comprising:
providing a first member;
forming a tongue extending from a surface of the first member;
forming a first groove in a side of the tongue; wherein at least a portion of the side of the tongue including the first groove extends generally perpendicular to the surface of the first member;
providing a second member; and
forming a second groove in a surface of the second member, the second groove being arranged to receive the tongue, and a lip extending into the second groove;
wherein, in an assembled position, the tongue is arranged to slot into the second groove and the lip is arranged to slot into the first groove thereby to join the first and second members;
wherein the lip is formed from a relatively hard material and the tongue is formed from a relatively soft material;
wherein the sides of the first groove are generally perpendicular to the side of the tongue in which the first groove is located; and
wherein the sides of the second groove are generally perpendicular to the surface of the second member in which the first groove is located.

16. The method of claim 15, wherein at least one of: forming a tongue extending from a surface of the first member; forming a first groove in a side of the tongue; and forming a second groove in a surface of the second member, the second groove being arranged to receive the tongue, and a lip extending into the second groove; comprises using a 3-axis computer numerically controlled (CNC) router.

17. A non-transitory software product arranged to perform the method of claim 16.

18. A joint assembly for panel board materials, comprising:
a first member comprising a tongue extending from a surface of the first member, the tongue comprising a first groove in a side of the tongue; wherein at least a portion of the side of the tongue including the first groove extends generally perpendicular to the surface of the first member; and
a second member comprising:
a second groove in a surface of the second member, the second groove being arranged to receive the tongue; and
a lip extending into the second groove;
wherein, in an assembled position, the tongue is arranged to slot into the second groove and the lip is arranged to slot into the first groove thereby to join the first and second members;
wherein the lip is formed from a relatively hard material and the tongue is formed from a relatively soft material;
wherein the first and second members are pieces of panel material;
wherein the tongue is on an edge of the first member; and
wherein the tongue is rebated.

19. A joint assembly according to claim 18, wherein the sides of the first groove are generally perpendicular to the side of the tongue in which the first groove is located.

20. A joint assembly according to claim 19, wherein the sides of the second groove are generally perpendicular to the surface of the second member in which the first groove is located.

* * * * *